(12) United States Patent
Kleyman et al.

(10) Patent No.: US 11,312,524 B1
(45) Date of Patent: Apr. 26, 2022

(54) FLEXIBLE TUBE STRUCTURE AND METHOD OF FABRICATION

(71) Applicants: Gennady I. Kleyman, Brooklyn, NY (US); Yuriy Chernov, Brooklyn, NY (US)

(72) Inventors: Gennady I. Kleyman, Brooklyn, NY (US); Yuriy Chernov, Brooklyn, NY (US)

(73) Assignee: Kletcher, LLC, Wilmington, DE (US)

( * ) Notice: Subject to any disclaimer, the term of this patent is extended or adjusted under 35 U.S.C. 154(b) by 0 days.

(21) Appl. No.: 17/470,005

(22) Filed: Sep. 9, 2021

(51) Int. Cl.
| | |
|---|---|
| *B65D 1/40* | (2006.01) |
| *B29C 45/00* | (2006.01) |
| *B29C 45/26* | (2006.01) |
| *B65D 25/38* | (2006.01) |
| *B29L 31/00* | (2006.01) |
| *B29K 23/00* | (2006.01) |

(52) U.S. Cl.
CPC ............ *B65D 1/40* (2013.01); *B29C 45/0001* (2013.01); *B29C 45/261* (2013.01); *B65D 25/38* (2013.01); *B29K 2023/06* (2013.01); *B29K 2023/12* (2013.01); *B29L 2031/712* (2013.01)

(58) Field of Classification Search
CPC ...... B65D 35/285; B65D 35/28; B65D 35/24; B65D 1/40; B65D 1/0207; B65D 1/0261; B65D 1/0223; B29B 11/08; B29B 11/06; B29B 11/14; B29C 49/0005; B29C 49/06; B29C 49/08

USPC ........ 220/675, 671, 670, 669, 604, DIG. 11, 220/DIG. 14; 222/103, 95, 92; 264/241, 264/921, 911, 478, 645; 215/371, 370
See application file for complete search history.

(56) References Cited

U.S. PATENT DOCUMENTS

| | | | | |
|---|---|---|---|---|
| 2,638,250 | A * | 5/1953 | Houldsworth | ......... B65D 35/28 222/95 |
| 3,313,455 | A * | 4/1967 | Kemmer | ................ B65D 35/28 222/103 |
| 6,302,298 | B1 * | 10/2001 | Chernov | ................ B65D 35/28 222/103 |
| 11,084,629 | B1 * | 8/2021 | Kleyman | ............... B65D 35/28 |
| 2017/0349334 | A1 * | 12/2017 | Kleyman | .................. B32B 1/08 |
| 2018/0155090 | A1 * | 6/2018 | Kleyman | .................. B32B 1/08 |

* cited by examiner

*Primary Examiner* — Robert J Hicks (57) ABSTRACT

A tubular container and container forming device and method according to the present invention provides a dispensing tubular container having a dispensing end, a sealed end, and a region along the length of the tubular container having surface variations (e.g. outward extending teeth) formed along the length of the tubular container as part of the tubular container over which a movable compression device may move, engage and be longitudinally retained as it is advanced toward the dispensing end. The teeth may have a radial and lateral wall thicknesses similar or equal to the tubular container wall thickness, to thicknesses greater than the tubular container wall thickness, and further include varying radial thickness or profile along an exterior dimension (e.g. length) of the tubular container. Also included are structures and processes to provide an injection molded polyethylene or polypropylene tubular container having longitudinal formations of desired wall thicknesses or profile.

22 Claims, 9 Drawing Sheets

FLEXIBLE TUBE STRUCTURE AND METHOD OF FABRICATION

FIELD OF THE INVENTION

The preset invention relates tubular fluid or semi-fluid material dispensing injection molded containers and the formation thereof, in particular, to deformable fluid dispensing injection molded containers including structures molded into the wall along the length of the tubular material container to retain external tubular container compression members.

BACKGROUND OF THE INVENTION

Injection molded tubular elongated containers for dispensing material, e.g. thickened fluids such as gels, pastes, typically have a dispensing end with an opening area typically less than the cross-sectional area of the tubular container, and a sealed end at the opposite end of the tubular container, and material is dispensed through the dispensing end by compression on the tubular container on opposing sides of the tubular container between the sealed end and the dispensing end, or pressure progressively from the sealed end. Typically, the dispensing compression is manually applied near the sealed end and advanced toward the dispensing end as the material within the container exits the dispensing end until the compressions reach the dispensing end.

The compression force may be applied with an external compression device which is shaped to surround the tubular container and placed on the tubular container to surround the tubular container and is movable from the sealed end toward the dispensing end, and includes a closely spaced region which acts to compress the tubular container within that closely spaced region, which urges the contained material out of the dispensing end.

To retain the compression device at the last location along the tubular container the compression device was moved, an engaging device that engages a separate member which, is added along the length of the tubular container on its outer surface and extends outward from the tubular container with a surface that is engaged by the compression device.

SUMMARY

The tubular container and container forming device, and method according to the present invention provides an injection molded dispensing tubular container typically having a dispensing end, a sealable end, and a region along the length of the tubular container having surface variations (e.g. outward extending teeth) formed along the length of the tubular container as part of the tubular container to which a compression device may engage and be longitudinally retained as it is advanced toward the dispensing end. According to various embodiments, the teeth (or other formed structure to which the compression device may engage and be longitudinally retained) is part of the tubular container wall and may have a radial wall thickness similar or equal to the tubular container wall thickness, or a thicknesses greater than the tubular container wall thickness, and further include radially varying thickness or profile.

Furthermore, the apparatus and methods of the present invention includes mold structures and injection molding processes to provide the tubular container having a portion of the tubular container wall including a region formed to allow an external compression device engage and be retained on the tubular container.

BRIEF DESCRIPTION OF THE DRAWINGS

These and further features of the present invention will be better understood by reading the Detailed Description together with the Drawings, wherein.

DETAILED DESCRIPTION

Figure 1:
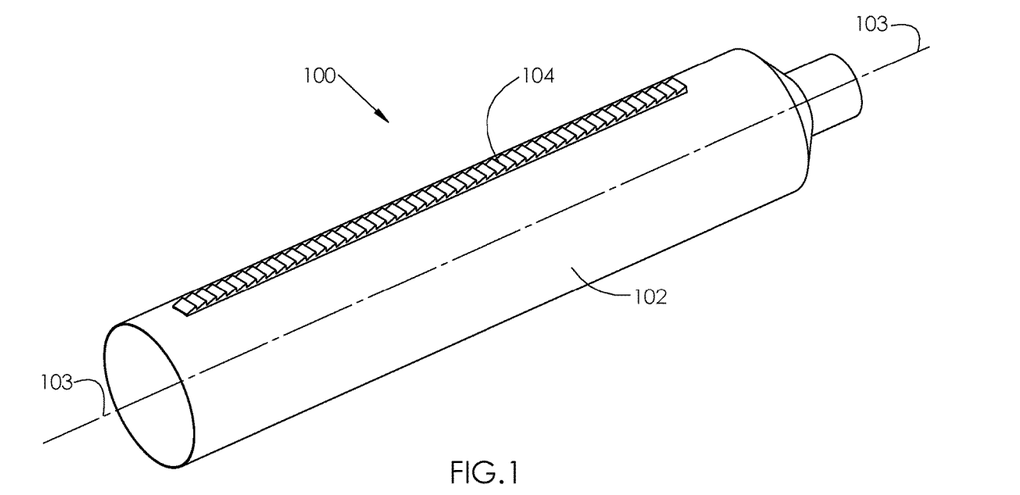
FIG. 1 is an isometric view of one embodiment a tubular container according to the present invention.

The formed tube 100 according to the present invention typically comprises a tubular member 102 that may include additional features connected or formed with it, such as a narrowed diameter dispensing end 101 that includes a transitional conical (or other shaped) section having end diameters that match the tubular member main section and the narrowed dimension dispensing end. Alternately, it could include enlarged or specifically shaped dispensing opening(s), not shown. The exemplary formed tubular member 100 and dispensing end 101 typically extends along a longitudinally extending axis 103 which may be centered within the tubular member tube 102. In the embodiment of FIG. 1, the tubular member 100 comprises walls substantially smooth and parallel to the axis 103 and includes a row of radially extending teeth 104 together typically extending substantially parallel to the axis 103. The teeth 104 may comprise 'saw-tooth' teeth of gradually increasing outward profile and dimension, but may also comprise other shapes and profiles (e.g. spaced flat-topped segments) or other surface characteristics which may be engaged by an external member.

Figure 2:
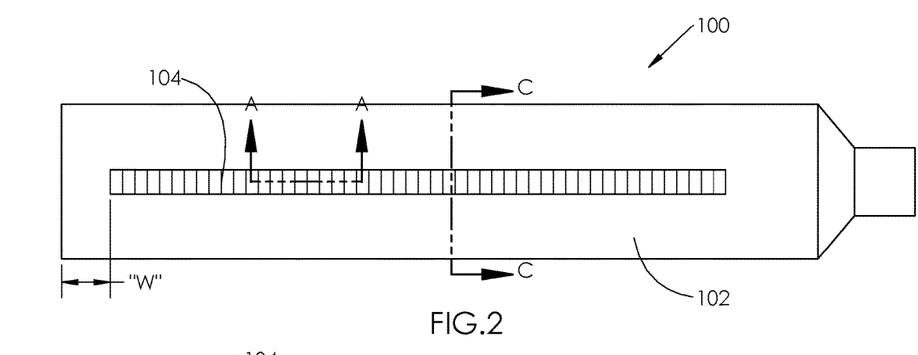
FIG. 2 is a top view of the tubular container according to the embodiment of FIG. 1.
Figure 3:
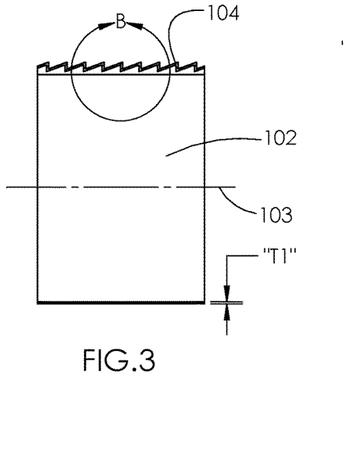
FIG. 3 is a section A-A of the tubular container embodiment of FIG. 2.
Figure 4:
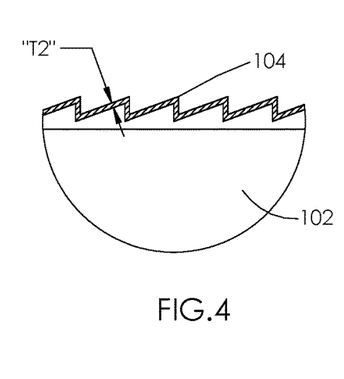
FIG. 4 is an enlarged view B of the embodiment of FIG. 3.
Figure 5:
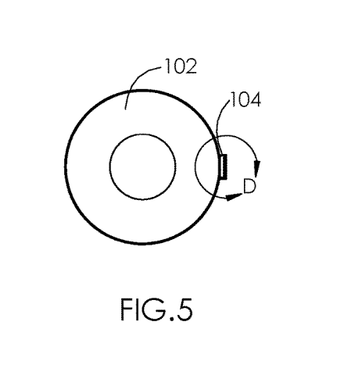
FIG. 5 is a section C-C taken from the embodiment of FIG. 2.
Figure 6:
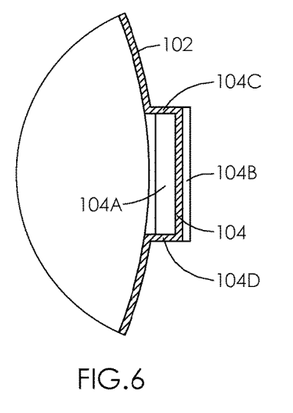
FIG. 6 is an enlarged view D taken from the embodiment of FIG. 5.
Figure 7:
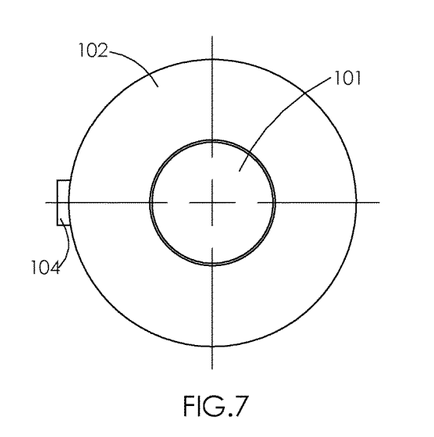
FIG. 7 is a view of the end of a tubular container mold inner portion of a first embodiment.

As shown in FIG. 2, in the tubular member embodiment 100, the row of teeth 104 partially extends along the length of the tubular member 100, leaving a longitudinal space at the dispensing end 101 and longitudinal space W at the opposite, unreduced diameter end. In the present embodiment, the row of teeth 104 comprise uniformly spaced outward (radially away from axis 103) ramp-like teeth which periodically return closer to the axis, and have a profile that is farther away from the axis 103 than the adjoining portions of the tubular member tube 102; alternate embodiments may include lesser radial displacement than the adjoining tubular member tube 102 portions. Indicated on FIG. 2 are longitudinal and transverse cross-sectional reference markings A-A and C-C, respectively, illustrated in greater detail on the following FIGS. 3-4 and 5-6. The vertical cross-section A-A substantially bisects the row of teeth 104 and the tubular member tube 102 having thickness T1, and also includes the axis 103. A further enlarged detail B of the teeth is shown enlarged in FIG. 4, wherein the formed teeth 104 comprise thickness T2, which in this embodiment are similar or equal in thickness to other (e.g. wall) portions of the tubular member 102, and may be of relatively different thicknesses as desired. The transvers cross-section C is shown in FIG. 5, and a portion D is enlarged and shown in FIG. 6, wherein interior 104A and exterior 104B wall portions of the tapered teeth 104 are show, wherein the teeth perpendicular walls 104C, 104D are also shown, having (in this embodiment) similar if not the same thickness as the tubular member tube 102 wall thickness, and may be different in other embodiments (not shown). An axial view including tubular member wall 102, dispensing end 101, and end of row of teeth 104 is shown in FIG. 7.

Figure 8:
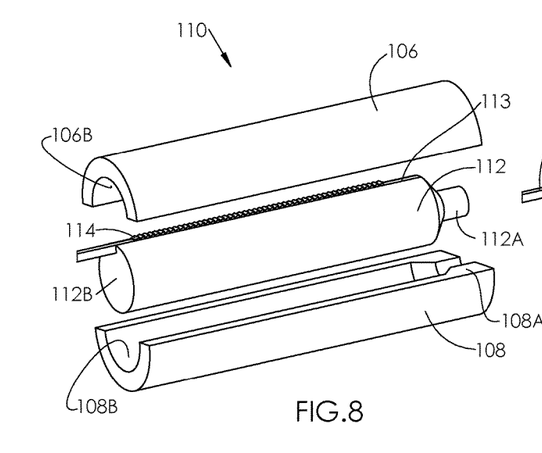
FIG. 8 is an exploded isometric view of a first embodiment of an openable mold structure providing the embodiment of FIG. 1.

In the formation process of the tubular member 100 according to the present invent-tion, an exploded view of a first embodiment 110 of a mold according to the present invention is shown in FIG. 8, including a solid or shaped tubular mold interior portion 112 having a recess 113 which accepts teeth interior surface 104A (FIG. 6) forming member 114 having radially outward protrusions (124 FIGS. 21, 22) selected to complement and form the desired teeth interior surface 104A shape, and located longitudinally within the recess to provide the tubular member 102 spaces (e.g. W) longitudinally adjacent to the teeth 104. The mold interior portion 112 includes a longitudinal end 112A (together with mold 108 end 108A) shaped to form the interior and exterior of the dispensing end 101 of the tubular member tube 102.

Figure 9:
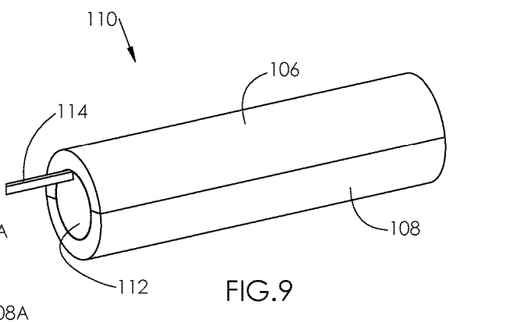
FIG. 9 is an isometric view of a closed mold structure of the embodiment of FIG. 7.
Figure 10:
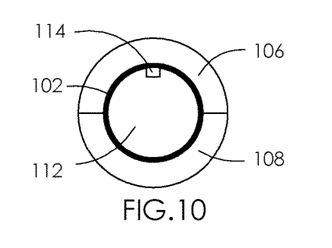
FIG. 10 and FIG. 11 are end and top views of the outer sections of the mold according to the embodiment of FIG. 7.
Figure 11:
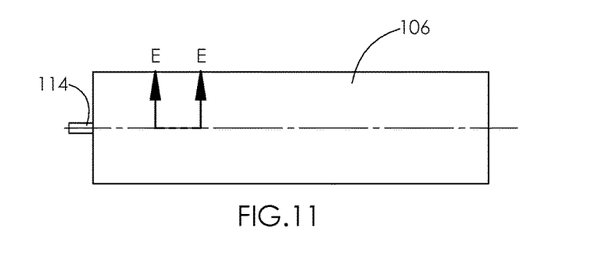
Figure 12:
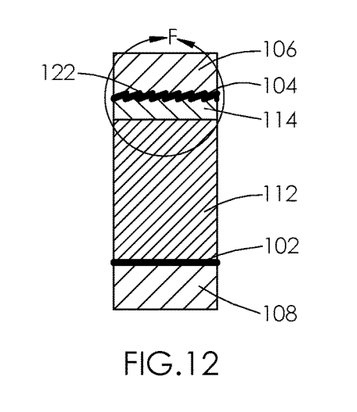
FIG. 12 is a sectional view E-E of a portion of the closed mold structure of the embodiment of FIG. 11.
Figure 13:
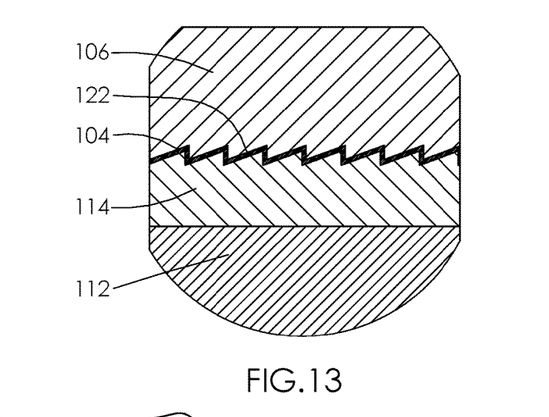
FIG. 13 is an enlarged view F of the portion of the embodiment of FIG. 12.

Complementary outer mating mold pieces 106 and 108 of FIGS. 8-10 are shaped to include an interior region which receives the mold interior portion 112 and having a space therebetween substantially equal to the desired tubular member tube 102 wall thicknesses of the various components (e.g. 101, 102, 104, etc.) thereof described elsewhere. The mold interior portion 112 includes an end 112B, and mating complementary outer mold pieces 106 and 108 include end regions 106B and 108B, and mold piece 106 include a recess 122 (also FIGS. 19, 20) shaped to form the outer surfaces 104B of the teeth 104 and complement forming member 114 at a distance to provide the desire teeth 104 thickness T2, and is shown in the end view of FIG. 10. A vertical cross-section E-E of FIG. 11 for the assembly of mold pieces 106, 108, 112, and 114 is isolated and shown in FIG. 12, which reveals the location of the formation of the teeth 104, and more visibly in the enlargement F of FIG. 13, the thickness of the formed portion of the teeth 104, wherein the facing dimensions of the complementary mold members 106, 108 and 112, 114 are chosen to provide the desired teeth wall thicknesses from material (e.g. plastic specifically including polyethylene and polypropylene, metal, etc.) to be formed therein, e.g. by injection molding, and between the mold pieces 106 and 112 member 114.

Figure 14:
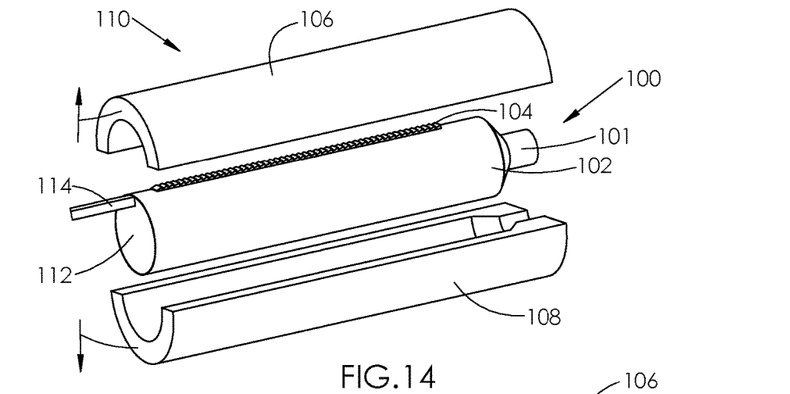
FIG. 14 is a perspective view of the post-molding opening of the mold outer portions of the embodiment of FIG. 8.
Figure 15:
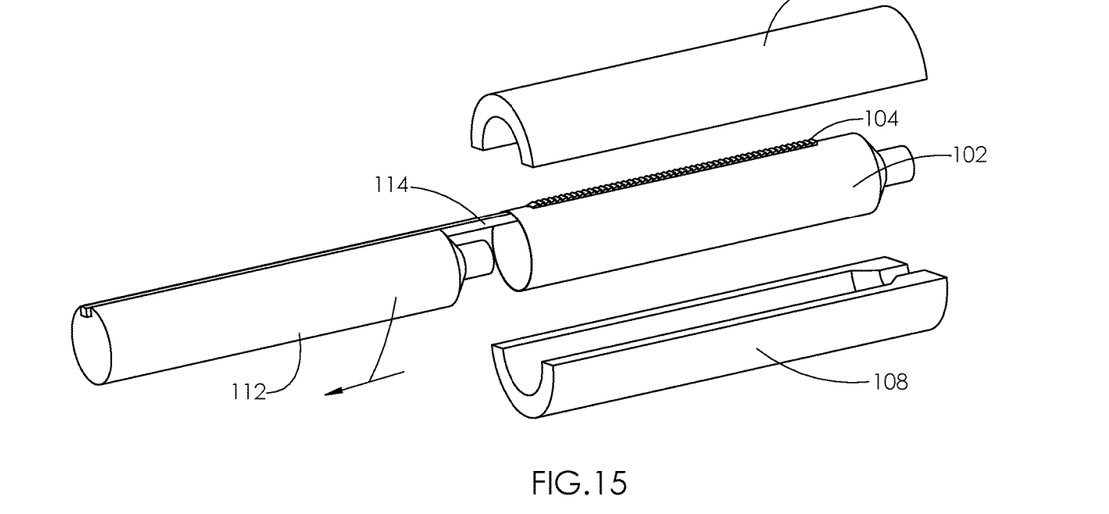
FIGS. 15, 16, and 17 are perspective views of a sequence of post-molding removal of the mold inner portions revealing the tubular container according to the embodiment of FIG. 8 of the preset invention.
Figure 16:
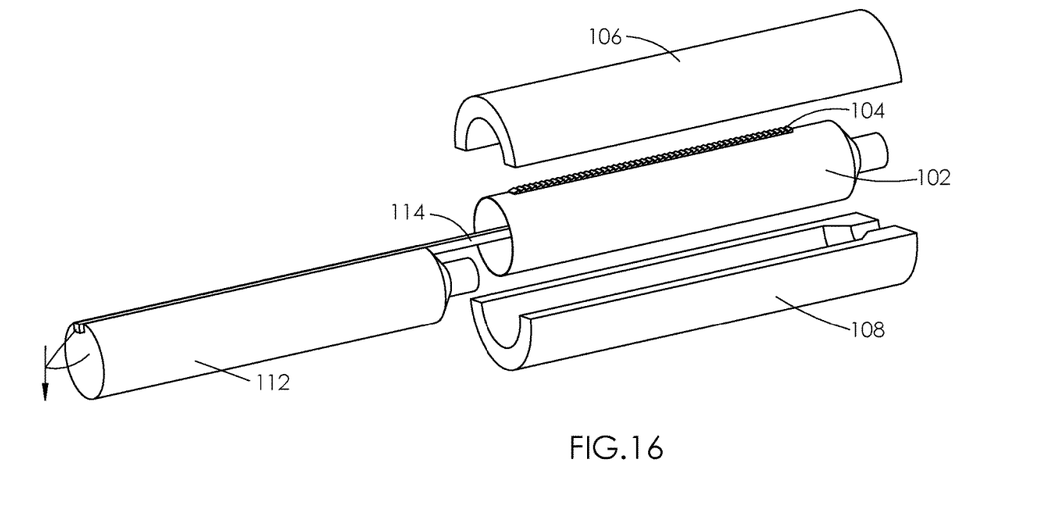
Figure 17:
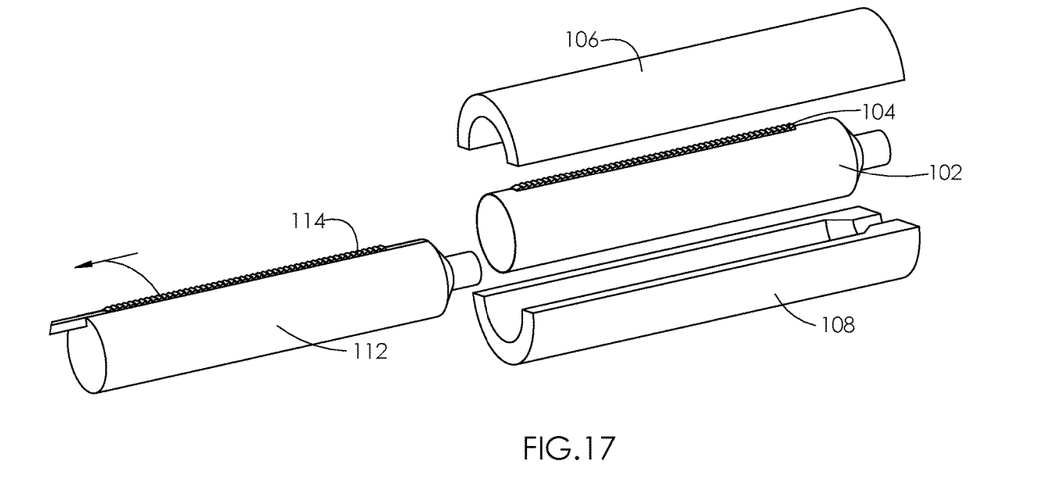

Subsequent to the injection and solidifying of the injected material (e.g. by cooling, UV treatment, chemical reaction, etc.), the complementary outer mold pieces 106, 108 moved apart as shown in FIG. 14, to reveal the formed outer surface of the tubular member 102 having teeth 104 formed therein. Separately, the interior mold piece 112 may also be removed as shown in FIG. 15, when the tubular member formation has become stable and the shape retained, leaving teeth forming member 114 to engage the interior surface (104A) of the teeth. The interior mold piece may be shaped with taper (narrower near 101), radially retractable, or otherwise to facilitate removal from the interior of tubular member 102. Subsequent to removal of the interior mold piece 112, the teeth forming member 114 is moved radially inward away from the interior surface 104A of the teeth 104 as shown in FIG. 16, and repositioned within the interior mold piece 112 groove 126 as shown in FIG. 17.

Figure 18:
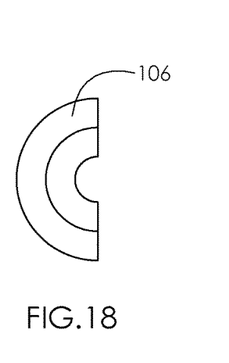
FIG. 18 and FIG. 19 are end and interior vertical interior views of one of the outer mold portions of the embodiment of FIG. 8.
Figure 19:
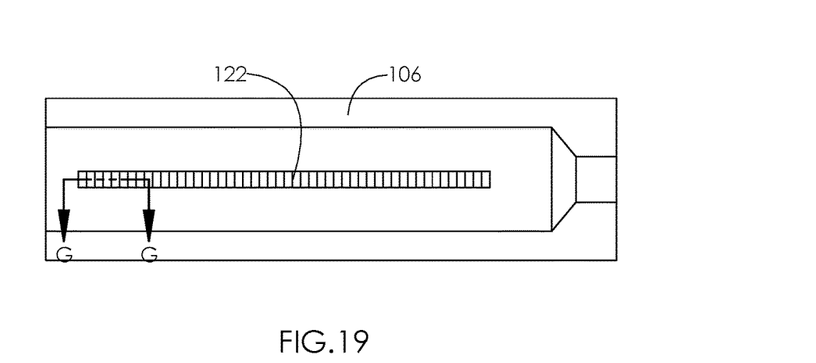
Figure 20:
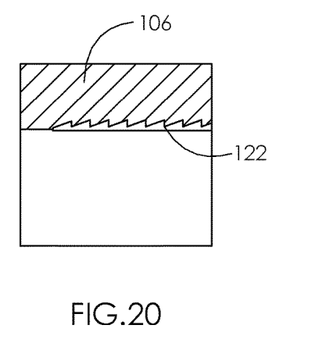
FIG. 20 is a cross-section view G-G taken from the embodiment of FIG. 19.
Figure 21:
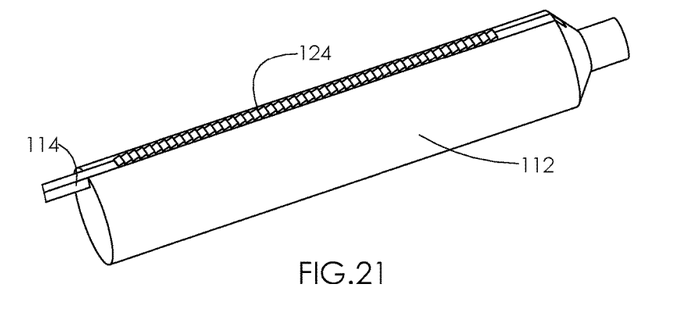
FIG. 21 is an isometric view of assembled elements of the inner mold portion of the embodiment of FIG. 8.
Figure 22:
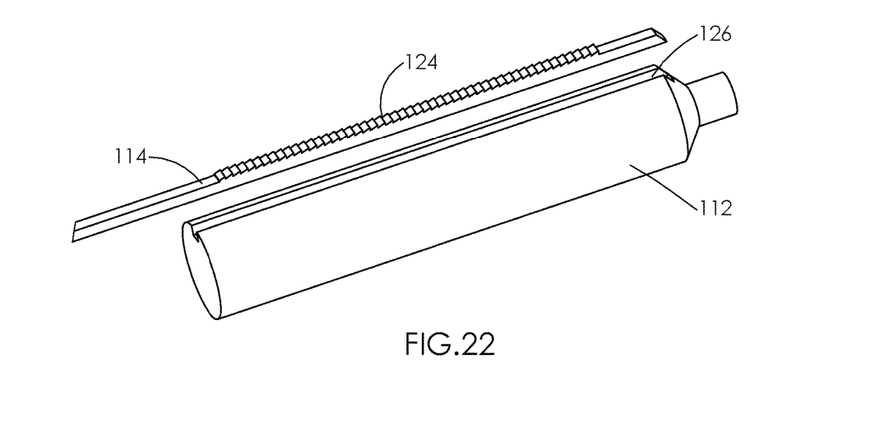
FIG. 22—is an exploded view of the elements of the inner mold portion of the embodiment of FIG. 8.

A closer look at the outer member 106 is shown from the dispensing end 101 in FIG. 18, and the interior view is seen in FIG. 19, showing a longitudinal recess 122 forming the outer surface (104B of the teeth 104), and in longitudinal cross-section along G-G shown in FIG. 20, wherein the recess 122 reduces the cross-sectional thickness of the outer member 106. The interior teeth forming member 114 having teeth-shaped region 124 along a portion of the member 114 corresponding to the teeth interior surface 104A and length of teeth region on the formed member 102 surface, and the member 114 is received in a longitudinal groove 126 along or in the interior mold member 112 as seen in FIG. 21. The members 112 and 114 are shown separated in FIG. 22.

Figure 23:
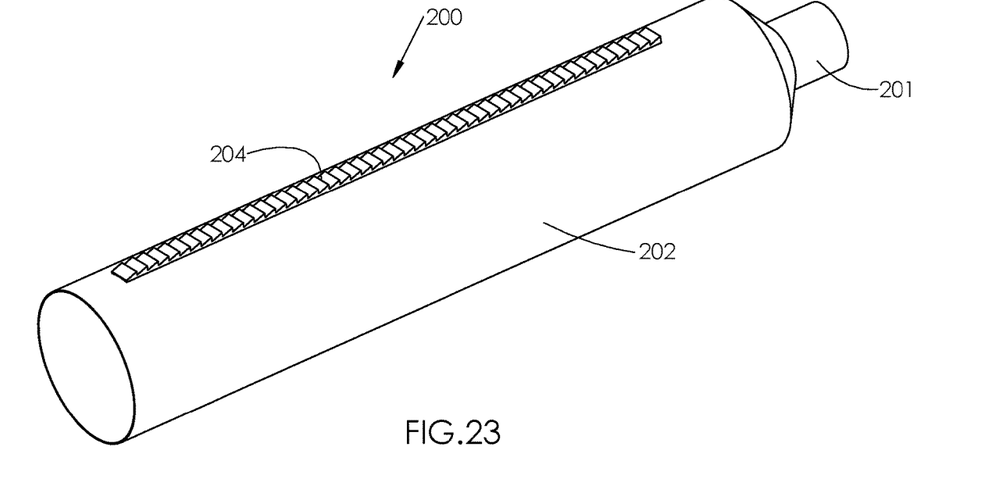
FIG. 23 is an isometric view of the tube formed from the embodiment of FIG. 8.
Figure 24:
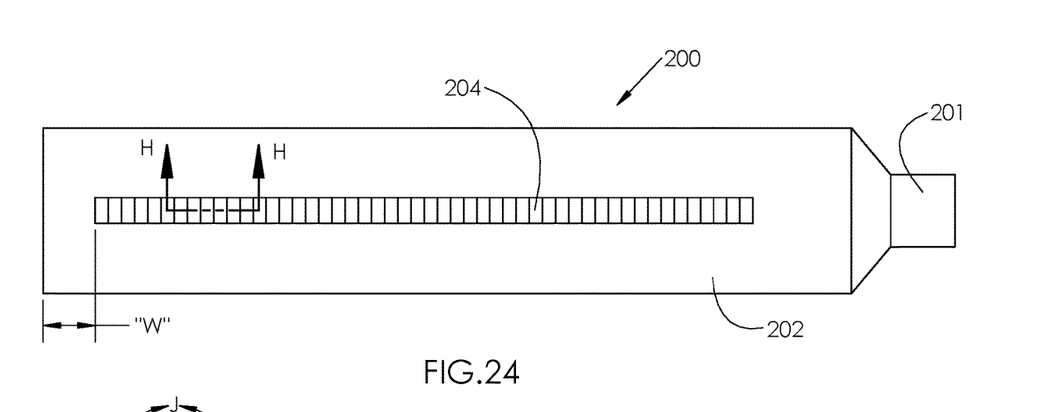
FIG. 24 is a top view of the tube embodiment formed by the mold portions of the embodiment of FIG. 8.
Figure 25:
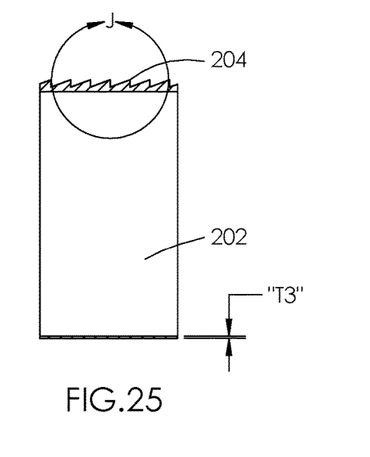
FIG. 25 is a section H-H taken from the tube embodiment of FIG. 24.
Figure 26:
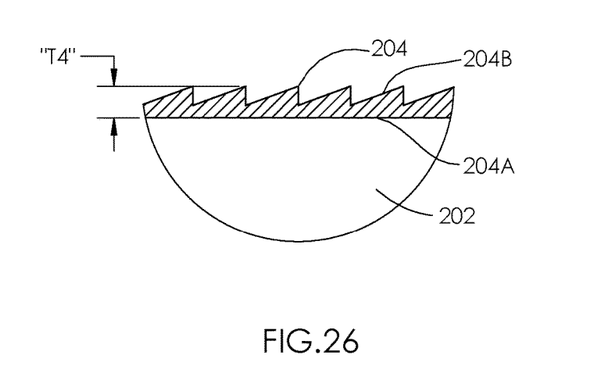
FIG. 26 is an enlarged view J taken from the embodiment of FIG. 25.
Figure 27:
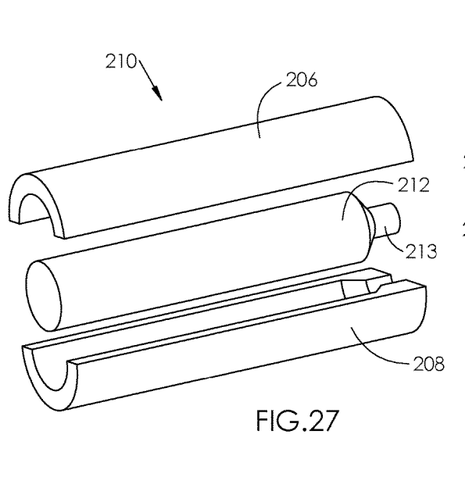
FIG. 27 is an isometric view of openable mold structure according to a second embodiment.
Figure 28:
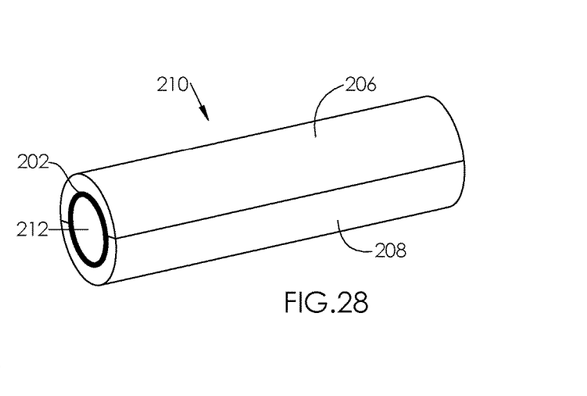
FIG. 28 is an isometric view of the mold according to the embodiment of FIG. 27 when the mold is closed.

An alternate embodiment 200 of the formed tubular member tube 202 is shown in FIG. 23, wherein an external row 204 of protrusions (e.g. teeth) are formed to include the tubular member tube 202 wall thickness without interior complementary teeth formations, and including additional thickness to provide the desired exterior profile (e.g. teeth) as protrusions thicker than the adjoining tubular member wall. The longitudinal segment of teeth 204 extend outwardly along a portion of the length of the tubular member tube 202, except for a region near the dispensing end 201 and a region W at the tubular member 202 opposite end, as shown in FIG. 24. Also indicated is a region of longitudinal cross-section H-H, wherein the horizontal view of the tubular member tube 202 cross section in FIG. 25 also indicates the representative tubular member tube 202 wall thickness T3, and a region to be enlarged and shown in FIG. 26, also showing teeth inner surface 204A and outer surface 204B. As shown in the embodiment of FIG. 26, the radial thickness T4 of the teeth 204 anywhere along its length is greater that of the tubular member 202 wall thickness T3.

Figure 29:
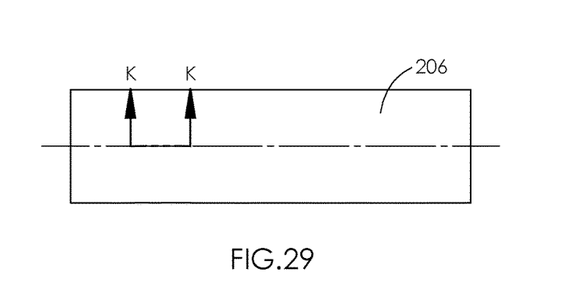
FIG. 29 is a top view of closed outer portions of the mold according to the embodiment of FIG. 27.
Figure 30:
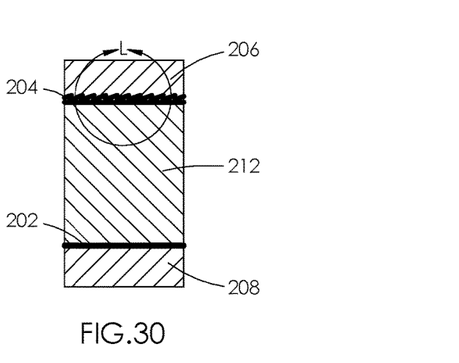
FIG. 30 is a section K-K taken from FIG. 29 of the embodiment of FIG. 27.
Figure 31:
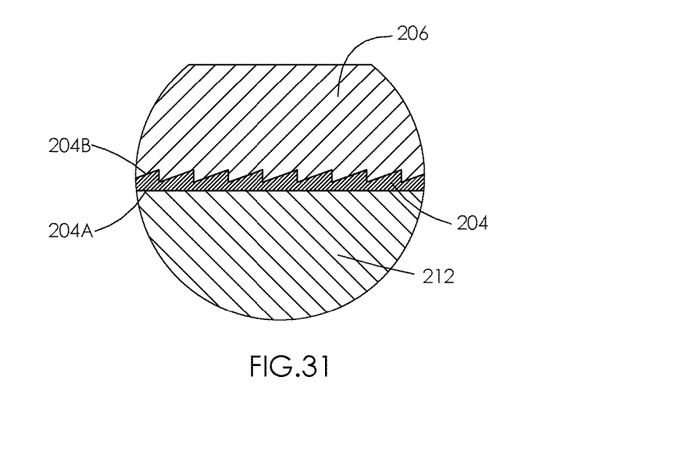
FIG. 31 is an enlarged view L taken from FIG. 30 the embodiment of FIG. 27.
Figure 32:
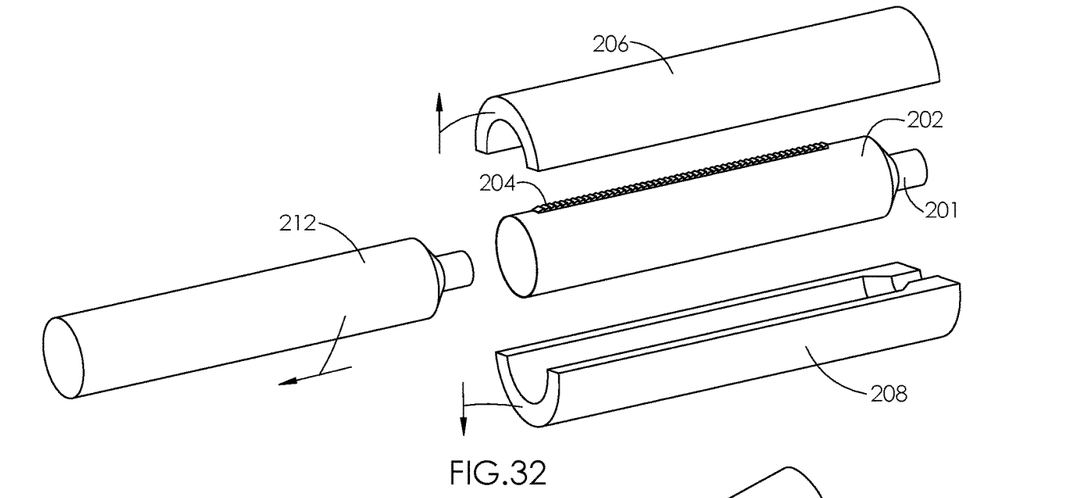

An alternate embodiment 210 of the tubular member 200 molding elements and process is shown in FIGS. 27-32, which includes complementary mating outer mold forms 206, 208 that surround the inner mold form 212 to form the tubular member 200 therebetween, similar to the mold forms 106, 108, 112 of the prior embodiment, with the exception that the tubular member 202 teeth 204 includes additional material (in the radial dimension) having an inner facing surface 204A closer to or co-equal with the adjoining tubular member tube 202 inner surface adjacent to the inner surface under teeth 204. One embodiment of the inner mold form 212 has a substantially continuous, smooth curved outer surface, and a connected end 213 of lesser outer dimension or diameter than the assembled mold forms 206, 208, 212 interior dimensions(s) to form a tubular member 200 dispensing end 201. A cross-section K-K of the assembled mold forms 206, 208, and 212 as indicated by FIG. 29 is shown in FIG. 30, showing the formed teeth 204 and a region L which is enlarged and shown in FIG. 31. As is shown in FIG. 30, the formed teeth 204 have a radial thickness greater than the tubular member tube 202 wall thickness elsewhere, e.g. on the radially opposite side of the tubular member tube 202. The detail of FIG. 31 shows the teeth 204 having non-uniform radial thickness according to the profile of the teeth outer surface 204B and a continuous straight inner surface 204A.

Subsequent to molding the tubular member 200, the outer mold forms 206, 208 are separated and the inner mold form is withdrawn from within the formed tubular member 200. In one embodiment, the inner form 212 may be tapered along its axis (e.g. a 'draft angle' providing a narrower proximal the dispensing end 201) to facilitate removal from the tubular member tube 202.

The various embodiments shown appear to have a circular mold and tubular member cross-section but are not to be limited thereto, but include other cross-section shapes as desired while conforming to the addition of the teeth (or other outward extending deformations) application and forming methods and apparatus as taught herein. The teeth (e.g. 104, 204) formed according to the present invention may also include shaped, thickened, and/or curved transition regions to the adjoining tubular member 102, 202 wall, as provided by corresponding shaping of the mold members.

Figures 33, 34:
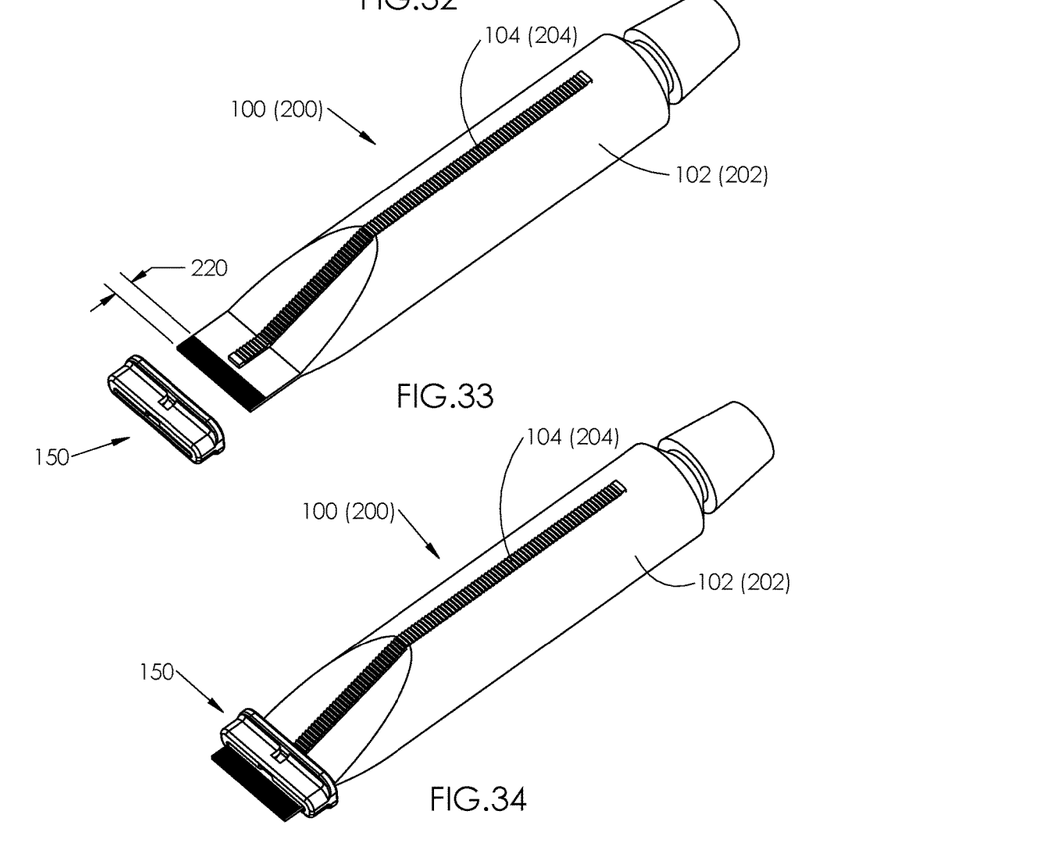
FIG. 33 and FIG. 34 are sequential views of tube fabrication before and after pusher compression member structure 150 is applied to the tube.

In use, the formed tubular member tube 102 (202) having the teeth 104 (204) shown in FIGS. 33 and 34, and sealed (typically thermally) at a region 220 at an end opposite to the dispensing end. The tubular member tube 102 (202) generally have an external quality of smoothness that includes the smoothness as provided by the forms described above, and receives an outer compression member 150 which is shaped to accept a compressed tubular member sealed end region 220 and advance over the tubular member tube having radially displaced (e.g. outward extending from the tubular member 102 (202) outer surface) teeth 104 (204) or other surface quality of smoothness which permits the compression member to engage. The outer compression member includes teeth engaging structures (e.g. a spring-loaded protrusion directed to engage the teeth 104 (204) such as shown in U.S. Pat. Nos. 10,337,533 and 6,302,298 incorporated by reference) to resist removal of the compression member from the tubular member tube 102 (202). The tubular members and corresponding mold element shapes include circular and non-circular cross-sections.

Figure 35:
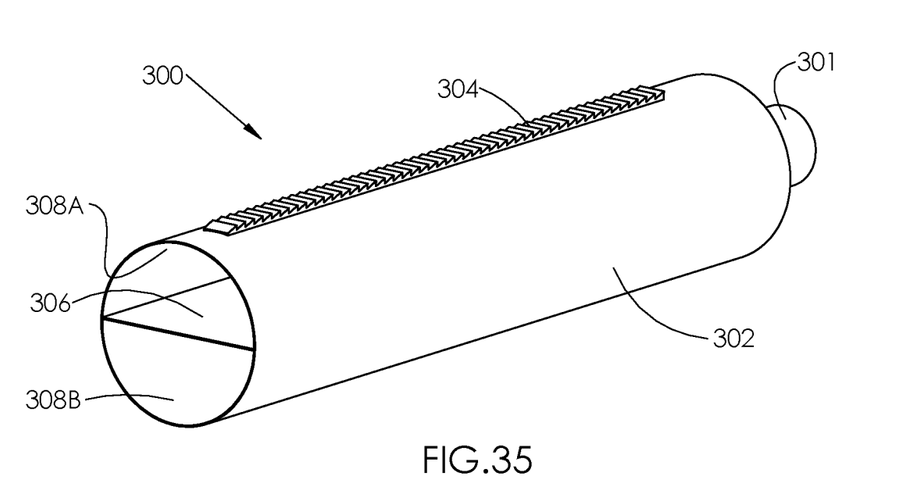
FIG. 35 is an isometric view of a dual-chambered tube provided by according to the embodiments of the present invention.
Figure 36:
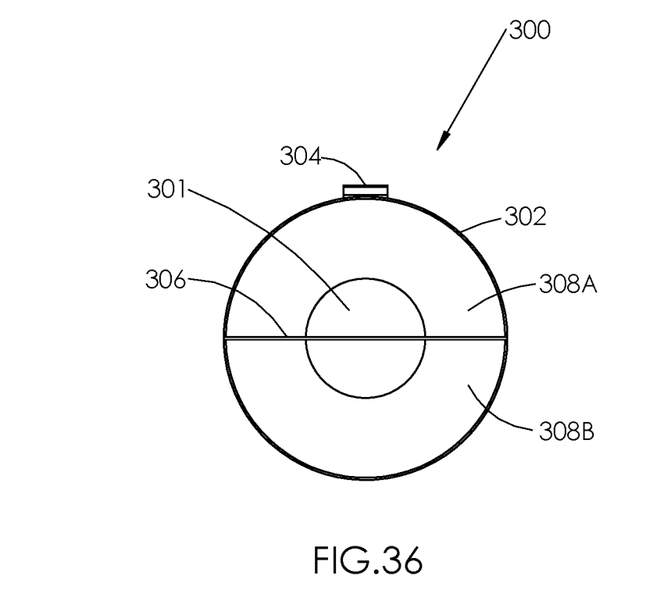
FIG. 36 is an end view of the dual-chambered tube of FIG. 35.

Embodiments include a tubular member 300 including a tube body 302 formed to include teeth 304, and with multiple longitudinal sections 308A, 308B divided by a molded tube body wall 306. The tube body wall 306 is typically provided by dividing (not shown) the internal mold forming elements (e.g. 112, 212) into longitudinal sectors corresponding to desired section, e.g. 308A, 308B, volumes and shaped to permit removal from the formed tube body, e.g. 302. The sections and resulting sectors may extend into the dispensing end 301 of the tube body 302, or end prior to the dispensing end, as desired.

Further modifications and substitutions made by one of ordinary skill in the art are within the scope of the present invention, which is not limited except by the claims which follow.

What is claimed is:

1. A tubular container, comprising:
   a tubular member having a length extending along an axis,
     a radius and a radial dimension including a molded outer wall, wherein said molded outer wall comprises
     a tubular member major surface of said outer wall and having a first quality of smoothness and a first radius, and
     a minor surface of said outer wall molded together with said outer wall molded first surface, and having at least one of
     a second quality of smoothness different from and contiguous with said major surface quality of smoothness, and
     a second radius different from said major surface first radius.

2. The tubular container of claim 1, wherein said tubular member minor surface includes a varying surface along the length of said axis.

3. The tubular container of claim 2, wherein said varying surface comprises teeth.

4. The tubular container of claim 3, wherein said teeth extends radially outward from said axis.

5. The tubular container of claim 2, wherein said molded outer wall major surface comprises a surface having a thickness, and said varying surface comprises a thickness substantially the same as said major surface thickness.

6. The tubular container of claim 2, wherein said varying surface comprises a varying thickness profile.

7. The tubular container of claim 1, further comprising a first end and an opposing second end, at least one thereof having a sealing formation thereon.

8. The tubular container of claim 7, wherein said first end sealing formation comprises a compression and joining of said outer wall.

9. The tubular container of claim 8, wherein said second end sealing formation comprises an openable structure.

10. The tubular container of claim 1, further including a compression device movable over said tubular container major surface and said tubular container minor surface, which engages said minor surface to be retained along said tubular member length.

11. The tubular container of claim 1, wherein said tubular member comprises an injection molded tubular member which includes multiple chambers each extending along at least a portion of said axis.

12. The tubular container of claim 1, wherein said tubular member comprises one of polyethylene and polypropylene.

13. A process of forming a tubular container, comprising:
forming a tubular member having a length extending along an axis, a radius and a radial dimension including an outer wall, including a major surface portion along said axis for a first portion of said outer wall radius and having a first quality of smoothness and a first radius, and
forming a minor surface portion along a length of said axis for a second portion of said radius having at least one of a second quality of smoothness different from said major surface quality of smoothness, and a second radius different from said first radius, wherein
said forming comprises injection molding the major surface and minor surface in unison.

14. The process of claim 13, wherein said forming the minor surface portion comprises forming the minor surface portion from said major surface portion.

15. The process of claim 14, further including forming a varying surface along the length of said axis.

16. The process of claim 14, wherein said forming a varying surface comprises forming teeth thereon.

17. The process of claim 13, comprises
providing an elongated inner mold having a radius corresponding to said major surface portion inner radius and a portion corresponding to said minor surface portion inner radius, and
providing an elongated outer mold having a radius corresponding to said major surface portion outer radius and a portion corresponding to said minor surface portion outer radius, spaced from said inner mold by tubular container wall thickness dimension, and
withdrawing said inner mold and said outer mold.

18. The process of claim 17, wherein
providing said outer mold includes providing an elongated and radial recess extending parallel to said axis and having a surface corresponding to an outer surface of said minor surface portion, and
providing said inner mold includes providing a radially movable elongated element extending along said axis having a surface corresponding to an inner surface of said minor surface portion.

19. The process of claim 18, further including disengaging said elongated element by radially inwardly moving said elongated element within said mold.

20. The process of claim 19, further including removing said inner mold and removing said outer mold.

21. The process of claim 13, wherein said tubular container major portion has a first wall thickness and said tubular member minor portion comprises a second wall thickness different from said first wall thickness.

22. The process of claim 13, wherein forming said tubular member comprises forming one of a polyethylene and a polypropylene tubular member.

* * * * *

UNITED STATES PATENT AND TRADEMARK OFFICE
CERTIFICATE OF CORRECTION

| | | |
|---|---|---|
| PATENT NO. | : 11,312,524 B1 | Page 1 of 1 |
| APPLICATION NO. | : 17/470005 | |
| DATED | : April 26, 2022 | |
| INVENTOR(S) | : Gennady I Kleyman and Yuriy Chernov | |

It is certified that error appears in the above-identified patent and that said Letters Patent is hereby corrected as shown below:

On the Title Page

Item [73], delete "Kletcher, LLC" and insert --Klecher, LLC--

Signed and Sealed this
Thirty-first Day of May, 2022

Katherine Kelly Vidal
*Director of the United States Patent and Trademark Office*